United States Patent

Krause

[15] 3,683,126

[45] Aug. 8, 1972

[54] ABRASION RESISTANT RECORDING HEAD

[72] Inventor: Gerhard Krause, Munich, Germany

[73] Assignee: Fernseh GmbH, Darmstadt, Germany

[22] Filed: May 15, 1970

[21] Appl. No.: 37,598

[30] Foreign Application Priority Data

June 19, 1969 Germany..........P 19 31 003.3

[52] U.S. Cl.......................179/100.2 C, 340/174.1 F
[51] Int. Cl.............................G11b 5/22, G11b 5/40
[58] Field of Search.............179/100.2 C, 100.2 CX; 340/174.1 F; 346/74 MC

[56] References Cited

UNITED STATES PATENTS

| | | | |
|---|---|---|---|
| 2,850,582 | 9/1958 | DeRaemy | 179/100.2 C |
| 2,431,541 | 11/1947 | Camras | 179/100.2 C |

FOREIGN PATENTS OR APPLICATIONS

| | | | |
|---|---|---|---|
| 776,348 | 6/1957 | Great Britain | 179/100.2 C |

*Primary Examiner*—Bernard Konick
*Assistant Examiner*—Jay P. Lucas
*Attorney*—Ernest F. Marmorek

[57] ABSTRACT

The body of the recording head is composed of a stack of alternately arranged abrasion resistant laminations and of magnetic laminations of relatively soft material. The abrasion resistant laminations are made of a hard metal alloy or of ceramics.

7 Claims, 7 Drawing Figures

Inventor:
Gerhard Krause by
His Attorney.

ABRASION RESISTANT RECORDING HEAD

This invention relates generally to magnetic information storing devices and, more particularly, to magnetic recording heads for such devices.

It has been known from prior art how to employ ferrites as magnetic material for the body of the magnetic head. Available ferrites, however, can be applied in heads for magnetic storing devices where the speed between the recording head and the magnetizable recording medium is relatively low such as, for example, in home tape recorders. If high recording and reproducing speeds are required in the magnetic storing devices, there may arise local overheatings and, consequently, the ferrite head body in the region of the magnetizing air gap may crumble.

There have also been employed magnetic heads where the magnetic head body has been provided with pole shoes of a magnetically soft alloy, such as the Fe-Al-Si alloy, or the entire head body is made of this alloy. The disadvantage of magnetic soft alloys resides in that the depth of the magnetizing air gap must be increased to insure a sufficient working life of the head (more than 100 hours) even at increased abrasion during high operational speeds. The excess gap depth, however, is disadvantageous since the effective portion of the magnetic flux that flows through the magnetizable coating of the information carrier is relatively small with respect to the flux portion within the air gap. As a result, there is required an increased amount of the distortion-free magnetic recording flux and, consequently, a more complex circuitry.

The hitherto employed magnetic heads represent, therefore, a compromise between the working life and the available electric power input. For the play-back, the conditions are still more disadvantageous since only a minute portion of the magnetic energy stored in the information carrier is applied to the coil of the magnetic head. The induced voltage is very low and, as a result, the signal-to-noise ratio is decreased.

BRIEF SUMMARY OF THE INVENTION

Accordingly, it is an object of this invention to remove the above described disadvantages of the magnetic information storing devices that result from the abrasion of the magnetic heads.

More particularly, it is an object of this invention to provide a magnetic head which is abrasion resistant even at great recording speeds.

Another object of this invention is to provide a magnetic head which has favorable magnetic properties.

Still another object of this invention is to provide a magnetic head having a reduced air gap depth.

According to this invention, the above objects are attained by providing at least in the pole shoes of the magnetic head a stack of alternately arranged laminations of magnetically favorable but abrasive material and laminations of an abrasion resistant material. These alternating laminations may be directed in parallel, or perpendicularly, or at an angle for example of 45°, with regard to the magnetizing gap of the head.

BRIEF DESCRIPTION OF SEVERAL VIEWS OF THE DRAWING

For a better understanding of this invention, reference is made to the following description of several embodiments of the magnetic head of the invention, taken in conjunction with the figures of the accompany drawing, in which:

FIG. **1*a*** is an elevational view, partly in section, of a conventional basic arrangement of a magnetic information storing device having a magnetic head and a movable information carrier;

Figure 1A:
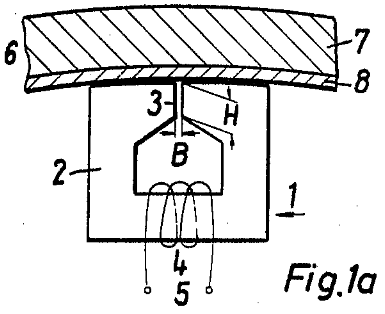
Figure 1B:
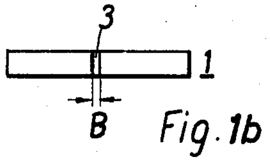
Figure 2:
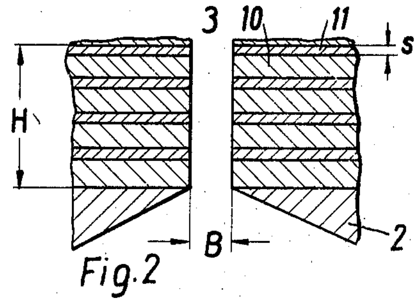
Figure 3:
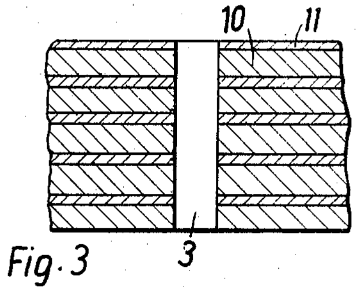
Figure 4A:
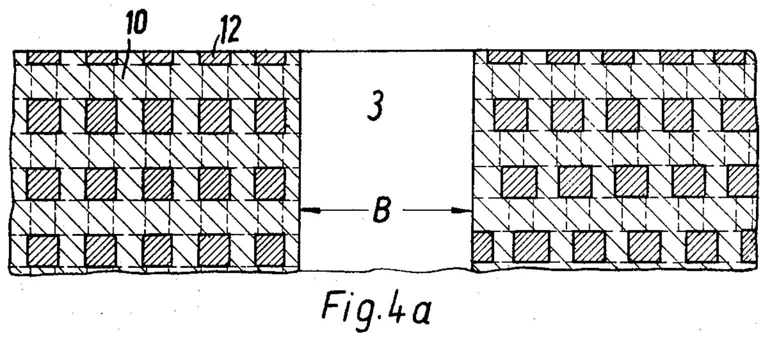
Figures 4B, 5:
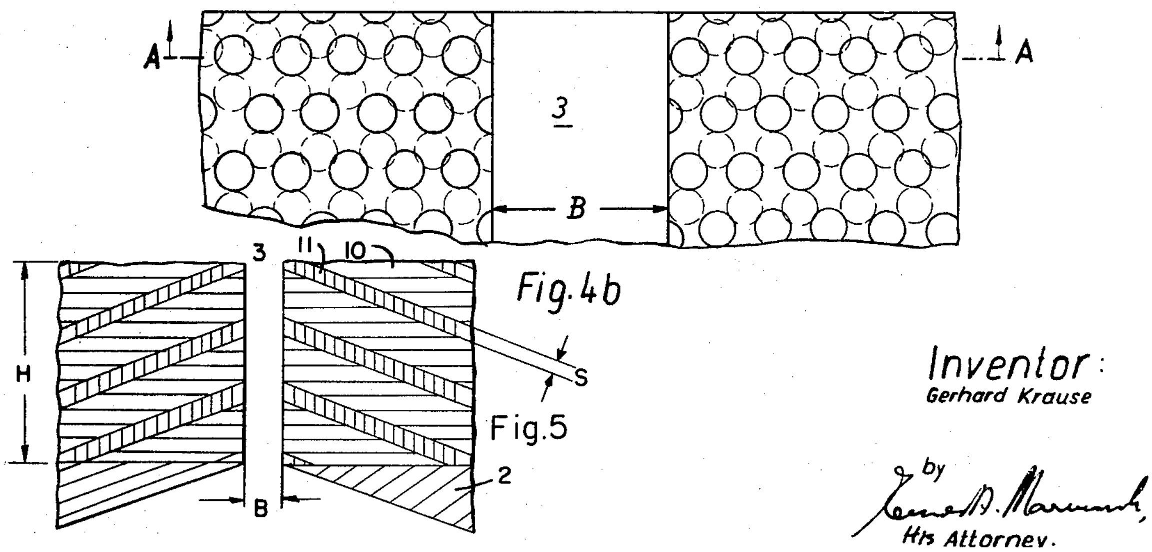

FIG. **1*b* is a plan view of the pole shoes of the magnetic head of FIG. 1*a***;

FIG. 2 is a schematic elevational view of the pole shoes of the magnetic head of this invention; and FIGS. 3 to **4*b* are plan views of the pole shoes of further modifications of the magnetic heads according to this invention and FIG. 5** is a schematic elevational view of the pole shoes of the magnetic head having laminations arranged at an oblique angle.

DETAILED DESCRIPTION

With reference to FIGS. **1*a* and 1*b*, there is shown a basic functional arrangement of a conventional magnetic head 1 in contact with a magnetizable information carrier 6. There are illustrated those parts only which are necessary for the understanding of this invention whereby like parts are denoted by identical reference numerals. The magnetic head 1 comprises a body 2 of a magnetically soft material. The body 2 is provided with pole shoes and with a gap 3 that are in contact with a magnetizable coating 8 on a movable coating carrier 7, such as a recording tape, for example. The intermediate portion of the magnetic body 2 supports magnetizing coil 4 having terminals 5. To produce a recording, electrical signals are applied to terminals 5 of the coil 4 and cause variations of the magnetic flux within the gap 3. The amount of the magnetic lines of force emerging from the gap 3 and magnetizing the coating 8 is a function of the signal strength, of the gap width B and of the gap depth H. The gap width B is predetermined by the limitations of the head production process and by the frequency range to be transmitted. With regard to the gap depth H, it has been known that by reducing the depth H, the ratio between the magnetic lines of force emerging from the gap 3 and the line of force within the gap 3 (i.e. between the pole shoes of the body 2) becomes more advantageous and, consequently, the required effective current for feeding the coil 4 can be reduced. In conventional magnetic heads, the gap depth H amounts approximately to 50 $\mu$m, thus insuring an economic working life of the head even at considerable abrasion between the magnetic head and the magnetizing coating. Such a size of the gap H necessitates, however, a relatively strong recording current flowing through the coil 4. Since the recording current must be in the non-distorted condition, complicated electrical circuits are required. During the play-back operation, there result still greater difficulties, since only a minute fraction of the magnetic energy stored in the coating 8 can be applied to the coil 4**.

In FIG. 2 there is shown an arrangement of the magnetic head of this invention which enables that the gap depth H may be considerably reduced without reducing the lifetime of the head even at considerable abrasive action of the coating 8. According to this invention, at least the pole shoes of the head body 2 are composed of a stack of magnetic laminations 10 interposed between abrasion resistant laminations 11. The alternately stacked laminations 10 and 11 are directed either parallel to the information carrier 6 or at an angle thereto such as, for instance, at 45°.

As seen in FIG. 2 the thickness *s* of the abrasion resistant layer 11 is inferior to the thickness of the magnetic laminations 10 and to the gap width B. It has been found that the most advantageous thickness *s* can be selected from the range of 0.1×B to 0.3×B, but it can attain, under certain circumstances, as large a magnitude as 3×B. The abrasion resistant laminations 11 can be made of a non-magnetic material or of a material having relatively inferior magnetic properties in comparison with the magnetic laminations 10, but being superior thereto with regard to the hardness. The laminations 11 can be made, for example, of a hard metal alloy, of a cemented carbide, of oxide ceramics or of metal ceramics (cermets). These laminations 11 can be manufactured by the metal spraying process, or by the flame plating process, by the plasma-flame process or by the vapor deposition.

With regard to the evenness of the magnetic laminations 10, there are required no high standards. As mentioned above, the thickness of the magnetic laminations 10 exceeds the thickness of the non-abrasive laminations 11 so that the effective permeability of the magnetic head remains substantially unaffected. The magnetic laminations 10 are produced of the Fe-Al alloy, for instance, by a vacuum metalling process, by a metal spraying process or electrolytically.

The alternative arrangement of the abrasion resistant laminations 11 and of the magnetic laminations 10 can set up either the entire magnetic head or the portion thereof that is in contact with the magnetic recording medium 6, for instance the pole shoes at each side of the magnetizing gap 3. The laminations can be also made in the form of abrasion resistant and magnetic foils, mutually connected by the application of pressure. For the reason of simplicity, there is shown a reduced amount of the laminations 10 and 11 only. In the practice, however, the magnetic head is composed of up to a hundred lamination pairs.

FIG. 3 shows a further embodiment of the invention, the laminations 10 and 11 of which are directed perpendicularly to the gap 3 and the information carrier 6.

FIGS. 4*a* and 4*b* illustrate another modification of the abrasion resistant magnetic head of this invention. The non-abrasive layers 11 are interrupted at regular intervals to form a series of discontinuous abrasion resistant islands 12. The spacings between respective islands 12 are filled with magnetic material so that the magnetic flux in the head body remains uninterrupted. As seen in FIG. 4*a*, the islands 12 are mutually shifted in respective rows so as to favorably influence the magnetic flux in the head body. FIG. 4*b* illustrates circular configuration of the abrasion resistant islands 12.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. In a magnetic information storing device with a movable information storing carrier, a recording head including a head body, a pole region defining a magnetizing gap and being in contact with said information storing carrier, and a magnetizing coil on said head body, said pole region comprising a stack of alternately arranged laminations of magnetic material and of laminations of abrasion resistant material, said alternately arranged laminations being directed substantially parallel to the direction of movement of said information storing carrier.

2. A magnetic information storing device according to claim 1 wherein said laminations of abrasion resistant material are divided into a plurality of spaced portions and the spacings between said portions being filled with magnetic material to provide an uninterrupted magnetic flux.

3. A magnetic information storing device with a movable information storing carrier, comprising in combination:

a recording head including a head body, a pole region defining a magnetizing gap in contact with said information storing carrier, and a magnetizing coil, said pole region comprising a stack of alternately arranged laminations of magnetic material and of laminations of abrasion resistant material, said alternately arranged laminations being directed substantially parallel to said information storing carrier, said laminations of abrasion resistant material being divided into a plurality of spaced portions and the spacings between said portions being filled with magnetic material to provide an uninterrupted magnetic flux, said spaced portions of said abrasion resistant laminations being mutually off-set with respect to the next lamination.

4. A magnetic information storing device with a movable information storing carrier, comprising in combination:

a recording head including a head body, a pole region defining a magnetizing gap in contact with said information storing carrier and a magnetizing coil, said pole region comprising a stack of alternately arranged laminations of magnetic material and of laminations of abrasion resistant material, said alternately arranged laminations being directed substantially parallel to said information storing carrier, said abrasion resistant material being a hard metal alloy.

5. A magnetic information storing device with a movable information storing carrier, comprising in combination:

a recording head including a head body, a pole region defining a magnetizing gap in contact with said information storing carrier, and a magnetizing coil, said pole region comprising a stack of alternately arranged laminations of magnetic material and of laminations of abrasion resistant material, said alternately arranged laminations being directed substantially parallel to said information storing carrier, wherein said abrasion resistant material being an oxide ceramic.

6. A magnetic information storing device with a movable information storing carrier, comprising in combination:

a recording head including a head body, a pole region defining a magnetizing gap in contact with said information storing carrier, and a magnetizing coil, said pole region comprising a stack of alternately arranged laminations of magnetic material and of laminations of abrasion resistant material, said alternately arranged laminations being directed substantially parallel to said information storing carrier, said abrasion resistant material being a metal ceramic.

7. In a magnetic information storing device with a movable information storing carrier, a recording head including a head body, a pole region defining a magnetizing gap in contact with said information storing carrier, and a magnetizing coil, a top portion of said pole region near said magnetizing gap comprising a stack of alternately arranged laminations of magnetic material and of laminations of abrasion resistant material, said laminations being directed at a predetermined oblique angle to said gap.

* * * * *